United States Patent [19]

Zweegers

[11] 4,145,866
[45] Mar. 27, 1979

[54] TINES FOR AGRICULTURAL IMPLEMENTS

[76] Inventor: Petrus W. Zweegers, Nieuwendijk 46, Geldrop, Netherlands

[21] Appl. No.: 779,616

[22] Filed: Mar. 21, 1977

[30] Foreign Application Priority Data

Mar. 26, 1976 [NL] Netherlands ............. 7603165

[51] Int. Cl.² ............................................. A01D 77/08
[52] U.S. Cl. ................................... 56/400; 56/400.21
[58] Field of Search ............... 56/400, 400.16, 400.17, 56/400.18, 400.21; 172/713, 707, 708, 45

[56] References Cited

U.S. PATENT DOCUMENTS

| 2,478,282 | 8/1949  | Kyker    | 56/400    |
|-----------|---------|----------|-----------|
| 2,748,557 | 6/1956  | Eadie    | 56/400.16 |
| 3,014,335 | 12/1961 | Nolt     | 56/400    |
| 3,108,426 | 10/1963 | Rugg     | 56/400.21 |
| 3,126,693 | 3/1964  | Renn     | 56/400    |
| 3,402,542 | 9/1968  | Johnston | 56/400    |
| 3,664,107 | 5/1972  | Keller   | 56/400    |
| 3,765,159 | 10/1973 | Neff     | 56/400    |

Primary Examiner—Russell R. Kinsey
Assistant Examiner—Paul J. Hirsch
Attorney, Agent, or Firm—Edmund M. Jaskiewicz

[57] ABSTRACT

A tine for an agricultural implement such as a haymaker is made of tubular material such as spring steel through which extends a flexible core such as a steel wire cable which is anchored to the tine ends by local indentations at each tine end.

5 Claims, 3 Drawing Figures

TINES FOR AGRICULTURAL IMPLEMENTS

This invention relates to tines for agricultural implements, especially for haymakers, and it is an object of the invention to incorporate a fracture safety feature in the tines.

Tines for agricultural implements are usually made of a solid spring steel rod which is bent and/or coiled to the desired shape and which is clamped by a screw and nut connection to a supporting element of the agricultural implement. In operation, fractures of such tines cannot be avoided and it often happens that broken tine parts are lost in the field. During subsequent operations, these lost parts are often scooped up by other implements such as conditioners, balers or self loading carts and may then cause considerable damage when they get between rollers, gears or the like of such implements.

According to the invention, a tine for an agricultural implement, especially for a haymaker, comprises tubular material through which extends a flexible core which is anchored to the tine ends.

Since the flexible core is anchored to the tine ends, broken parts of the tubular material are maintained on the core and thus cannot be lost anymore in the field.

An additional advantage is that the flexible core acts as a damper which considerably decreases fractures by vibration.

The invention will be further elucidated with reference to the accompanying drawings.

Figure 1:
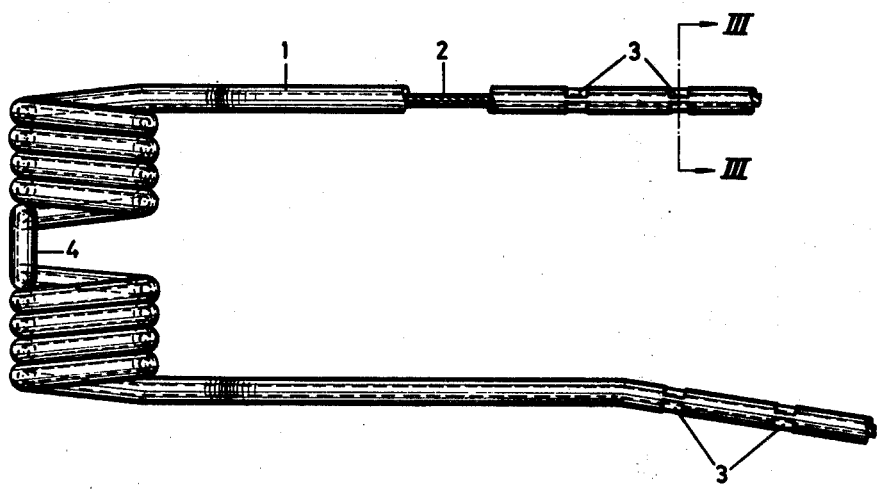
FIG. 1 is an elevational view of a tine according to an embodiment of the invention, in which part of the tubular material has been broken away to show the flexible core.
Figure 2:
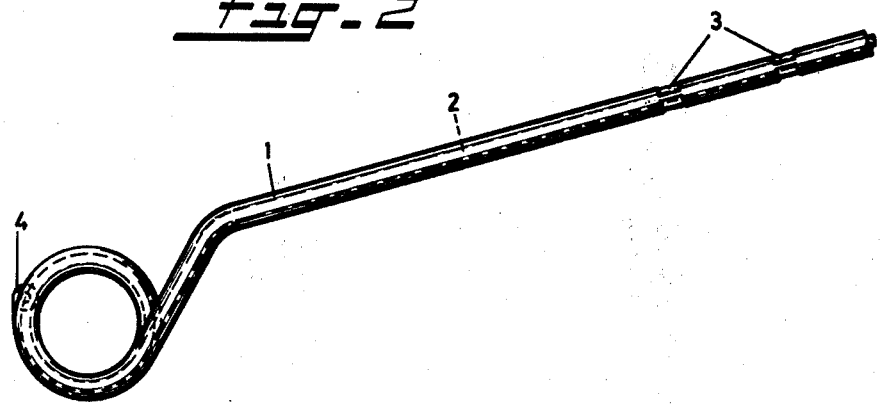
FIG. 2 is a plan view of the tine according to FIG. 1.
Figure 3:
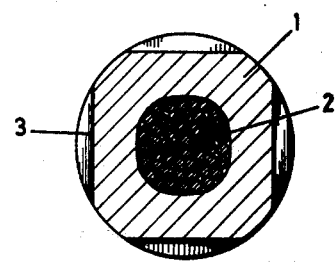
FIG. 3 is a section according to the line III—III in FIG. 1.

The tine is entirely made of resilient tubular material 1 such as spring steel which is substantially filled by a flexible core 2 such as a steel wire cable. Near each free end of the tine 1, 2 are provided local indentations 3 in the tubular material 1 which so narrow the interior section of the tube 1 that the core 2 is tightly clamped therein at these locations, as shown in FIG. 3. In this embodiment, the normally round section of the tube 1 and core 2 has been deformed by the local indentations to a more or less square shape, but it will be clear that other types of indentations could be used to clamp the core 2 in the tube 1 and that it would also be possible to use an entirely other manner of anchoring the core 2 to the tube 1 at the free ends of the tine. Also, there are two successive indentations 3 at each free end of the tine in this embodiment so as to be more certain of a tight enchoring, but a single indentation at each free end would in some cases be sufficient.

Although, in order to explain the structure more clearly, the drawings show the free ends of the tines as being broken off, it will be clear that in reality the free ends of the tines are cut off smoothly and perpendicularly to the axis close to the outermost indentation. The tine may extend, however, over a certain distance outwards of the outermost clamping location since fractures rarely occur in the outermost part.

In this embodiment, the tine has a central, loop shaped mounting part 4 and adjacent helically wound parts to provide spring coils, the outer ends of which extend outwards to provide the crop engaging parts of the tine. Although this is usually referred to as a "double tine", the whole structure is made of a single length of tubular material 1 and the flexible core 2 extends from one free end through the upper coil, the loop shaped mounting part 4 and the lower coil to the other free end of the structure.

When, the tine being attached to e.g. a haymaker, fractures occur during operation, only the tube 1 fractures, but not the flexible core 2. Since the core 2 and the tube 1 are anchored together close to the outer ends of the tine, broken parts of the tube 1 cannot escape but are maintained on the core 2.

What I claim is:

1. A tine for an agricultural implement, especially for a haymaker and the like, comprising a body of a resilient tubular material having a mounting part and at least one outer crop engaging free end spaced from said mounting part, and a flexible core extending through said body, said flexible core anchored to said body at said free end at least at one point to a greater degree than inwardly of said free end such that a broken part of the body inwardly of the free end will be maintained on the core.

2. A tine as claimed in claim 1, wherein the core is anchored to the tine free end by at least one local indentation of the tubular material close to said tine free end.

3. A tine as claimed in claim 1 wherein the core comprises a steel wire cable.

4. A tine as claimed in claim 1 wherein said mounting part is loop-shaped and the flexible core extends through said mounting part.

5. A tine as claimed in claim 4 wherein the tubular material is helically wound to define two free ends and spring coils at both sides of the loop shaped mounting part, the flexible core extends as a single piece from both free ends of the tine through said coils and said loop.

* * * * *